UNITED STATES PATENT OFFICE 2,077,528

AZO DYESTUFFS

August Modersohn, Cologne-Mulheim, and Erich Fischer, Bad Soden in Taunus, Germany, assignors to General Aniline Works, Inc., New York, N. Y., a corporation of Delaware No Drawing. Application December 30, 1935, Serial No. 56,790. In Germany January 12, 1935

4 Claims. (Cl. 260—44.6)

The present invention relates to azodyestuffs derived from aminosulfones, more particularly it relates to azodyestuffs which may be represented by the probable general formula:

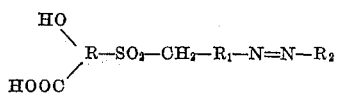

in which R and $R_1$ stand for benzene radicals, the carboxylic acid group and the hydroxy group in the benzene radical R standing in o-position to each other, and $R_2$ stands for the radical of a coupling component suitable for preparing azodyestuffs, such as for a radical of a pyrazolone or of a sulfonic acid of a 2-naphthylamine which has been coupled in the 1-position and which may bear further substituents, for example the hydroxy group.

Our new dyestuffs are obtainable by diazotizing amines of the general formula:

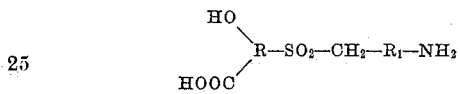

wherein R and $R_1$ mean the same as stated above, and coupling the same with coupling components suitable for preparing azodyestuffs. Favorably the components are selected in such a manner that at least one sulfonic acid group is present in the dyestuff molecule, and it is self-understood that the benzene nuclei R and $R_1$ may bear substituents, such as halogen, the alkyl, the alkoxy, the nitro and the acylamino group.

In this way there are obtained yellow to violet dyestuffs of very good fastness properties, which can be after-chromed on the fibre, and which are distinguished from the known dyestuffs of a similar constitution by a better fastness to light or better levelling properties.

The starting diazotization components used in the manufacture of our new dyestuffs can be obtained either by condensing the respective nitrobenzyl chlorides with suitably substituted aryl sulfinic acids, followed by reduction, or by nitration of suitably substituted phenyl benzyl sulfones and reduction.

The following examples illustrate the invention:

Example 1

135 grams of the amino compound of the formula

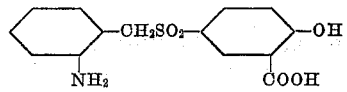

(manufactured by condensation of o-nitrobenzyl chloride with salicyl sulphinic acid, followed by reduction) are dissolved with the aid of caustic soda in 1 litre of water, and to the solution 30 grams of sodium nitrite are added. Then the solution is slowly introduced into a mixture of 300 ccs. of concentrated hydrochloric acid and 1 kg. of ice, and to the diazo compound obtained in this manner, there is added, while stirring, a paste of 2-amino-8-napthol-6-sulphonic acid corresponding to 120 grams of pure acid. Coupling commences even when the reaction is acid to Congo red, and, after some time, coupling is completed by adding sodium acetate solution drop by drop. For separating the dyestuff, the reaction mixture is rendered alkaline with sodium carbonate, heated to 60–70° C., and sodium chloride is added.

The dyestuff separated after cooling having in its free state the following formula:

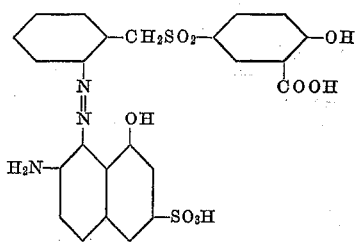

is filtered with suction and dried. It forms a redbrown powder, which dissolves in water with a yellowish red and in concentrated sulfuric acid with a violet coloration. The new dyestuff dyes wool, when after-treated with chromium salts, even, clear, yellowish red shades of good fastness properties.

Dyestuffs of similar properties are obtained by using as diazotizing components in the above example one of the following amino compounds:

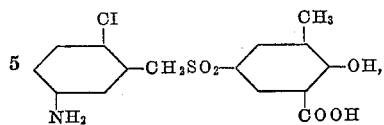

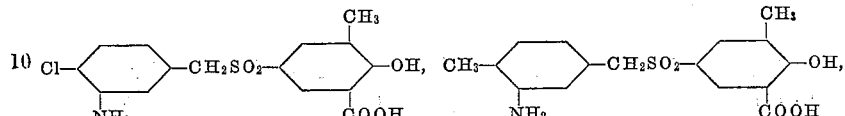

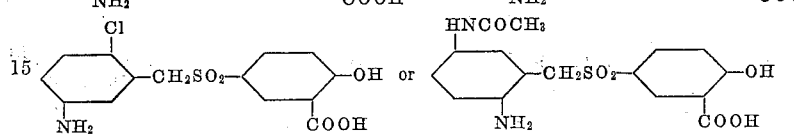

Dyestuffs which dye wool orange shades are obtained by using in the above example instead of the 2-amino-8-naphthol-6-sulfonic acid the corresponding quantity of the 2-naphthylamine-6- or 7-sulfonic acid. When substituting the 2-amino-8-napthol-6-sulfonic acid by the 2-methylamine-8-naphthol-6-sulfonic acid or the 2-ethylaminonaphthaline-7-sulfonic acid, there are obtained dyestuffs yielding more reddish shades, but having otherwise the same properties.

*Example 2*

100 grams of the amino compound

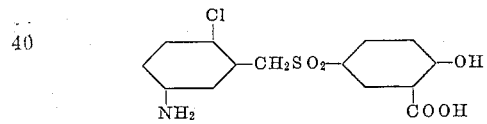

(manufactured by condensation of o-chlorobenzyl chloride with salicyl sulphinic acid, nitration of the sulphone obtained and reduction of the nitro compound) are dissolved in 400 ccs. of hot water with 120 ccs. of concentrated hydrochloric acid and then separated again, finely dispersed, while stirring, by quick cooling, and diazotized in the usual manner in 70 ccs. of water with 20 grams of sodium nitrite. The greater part of the diazo compound is dissolved in this way. The diazo compound thus obtained is coupled, in aqueous medium alkaline with sodium carbonate, with 85 grams of 1-(2'-chlorophenyl)-3-methyl-5-pyrazolone-5'-sulfonic acid.

The dyestuff having in its free state the following formula:

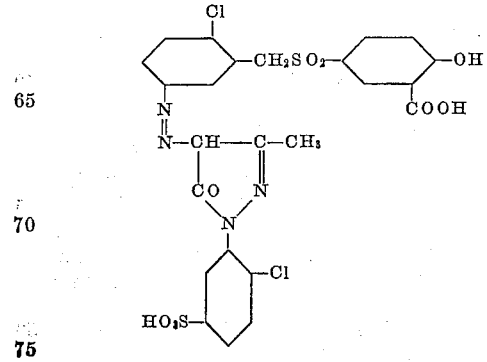

is separated with sodium chloride. The dyestuff, when dried, forms a yellow powder which dissolves in water and in concentrated sulfuric acid with a yellow coloration. The dyestuff dyes wool, when after-treated with chromium salts, even, clear, greenish yellow shades of good fastness properties.

On substituting the amino compound used in Example 2 by

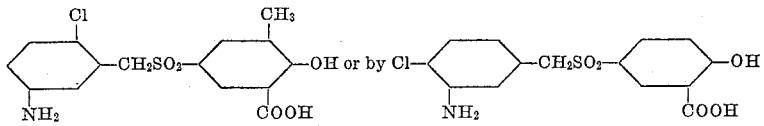

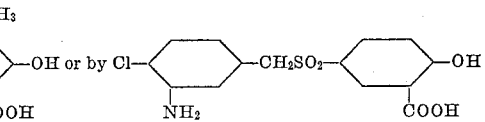

or using instead of the 1-(2'-chlorophenyl)-3-methyl-5-pyrazolone-5'-sulfonic acid other pyrazolone sulfonic acids, as for example the 1-(2'-chlorophenyl)-3-methyl-5-pyrazolone-4'-sulfonic acid or the 1-(2'-chlorophenyl)-3-methyl-5-pyrazolone or the 1-(2'.5'-dichlorophenyl)-3-methyl-5-pyrazolone or the 1-(2'-methylphenyl)-5-pyrazolone-5'-sulfonic acid or the 1-phenyl-5-pyrazolone-3-carboxylic acid amide, dyestuffs of similar properties are obtained.

*Example 3*

349 grams of the amino compound of the following formula:

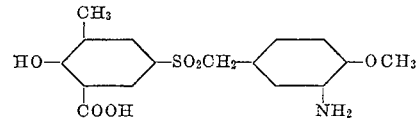

(manufactured by condensation of 3-nitro-4-methoxy-1-benzyl chloride with cresotin sulfinic acid, followed by reduction with iron and acetic acid) are dissolved in hot water and 400 ccs. of hydrochloric acid. The clear solution is slowly introduced into a mixture of hydrochloric acid and ice, contemporaneously an aqueous solution of 70 grams of sodium nitrite being introduced in such a manner that during the whole process there is present a small excess of the nitrite. The diazo compound separated is filtered with suction and added slowly to a solution of 98 grams of 3-methyl-5-pyrazolone alkaline with sodium. To the solution of the dyestuff common salt is added while heating, whereby the dyestuff having in its free state the following formula:

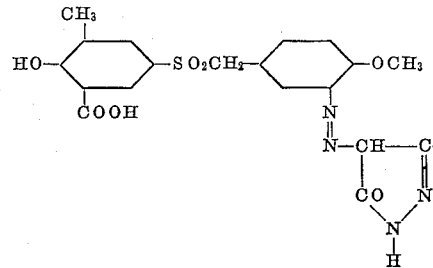

separates in a form well suitable for being filtered off. After drying it represents a yellow powder, soluble in water with a yellow coloration. When dyed on wool and chromed according to the one bath process reddish yellow shades of good fastness properties are obtained.

*Example 4*

85 grams of 2-amino-8-naphthol-6-sulfonic acid are dissolved in 1.5 litres of water with the addition of caustic soda, and while cooling reprecipitated in a finely divided form by adding the calculated quantity of hydrochloric acid. To the suspension there is added while stirring and cooling a diazo solution obtained by diazotizing with the calculated quantity of nitrosyl sulfuric acid 102 grams of 2-amino-5-nitrobenzyl-4'-hydroxy-5'-carboxy-phenylsulfone in 200 grams of concentrated sulfuric acid. Coupling already begins at strongly acid reaction and is completed in a short time by addition of sodium acetate solution. The dyestuff obtained having in its free state the following formula:

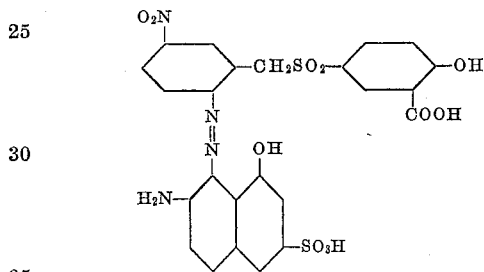

is filtered with suction, redissolved in water with the aid of soda and separated in the usual manner by salting out. The dried dyestuff is obtained in form of a nearly black powder dissolving in water with a reddish-violet, in concentrated sulfuric acid with a wine-red coloration. It dyes wool when afterchromed violet shades.

The 2-amino-5-nitrobenzyl-4'-hydroxy-5'-carboxyphenylsulfone of the formula:

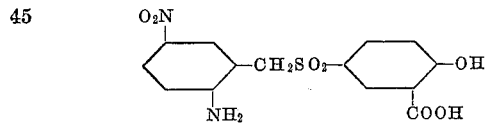

can be prepared by heating the 2-chloro-5-nitrobenzyl-4'-hydroxy-5'-carboxyphenylsulfone with ammonia under pressure, whereby the chlorine is substituted by the amino group.

We claim:

1. Dyestuffs having in the free state the following formula:

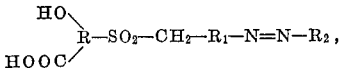

in which R and $R_1$ stands for benzene radicals, the carboxylic acid group and the hydroxy group in the benzene radical R standing in o-position to each other, and $R_2$ stands for a radical of a coupling component of the group consisting of pyrazolones and 2-naphthylamine sulfonic acids which have been coupled in the 1-position, dyeing the animal fibre generally yellow to violet shades of good fastness properties when after-chromed.

2. The dyestuff having in its free state the following formula:

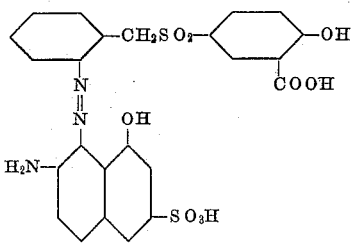

dyeing wool, when aftertreated with chromium salts, even, clear, yellowish-red shades of good fastness properties.

3. The dyestuff having in its free state the following formula:

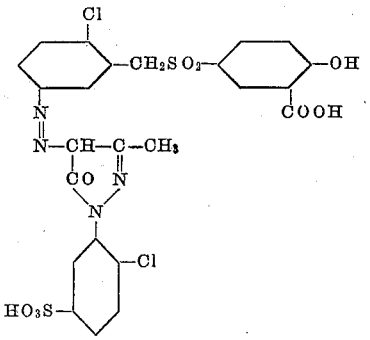

dyeing wool, when aftertreated with chromium salts, even, clear, greenish-yellow shades of good fastness properties.

4. The dyestuff having in its free state the following formula:

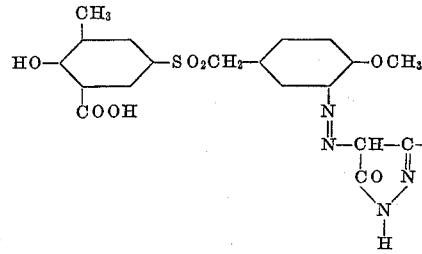

yielding on wool, when dyed and chromed according to the one bath process reddish-yellow shades of good fastness properties.

AUGUST MODERSOHN.
ERICH FISCHER.